Feb. 8, 1944.  I. L. STEPHAN  2,341,482
MULTISPEED MOTOR
Filed Feb. 9, 1942
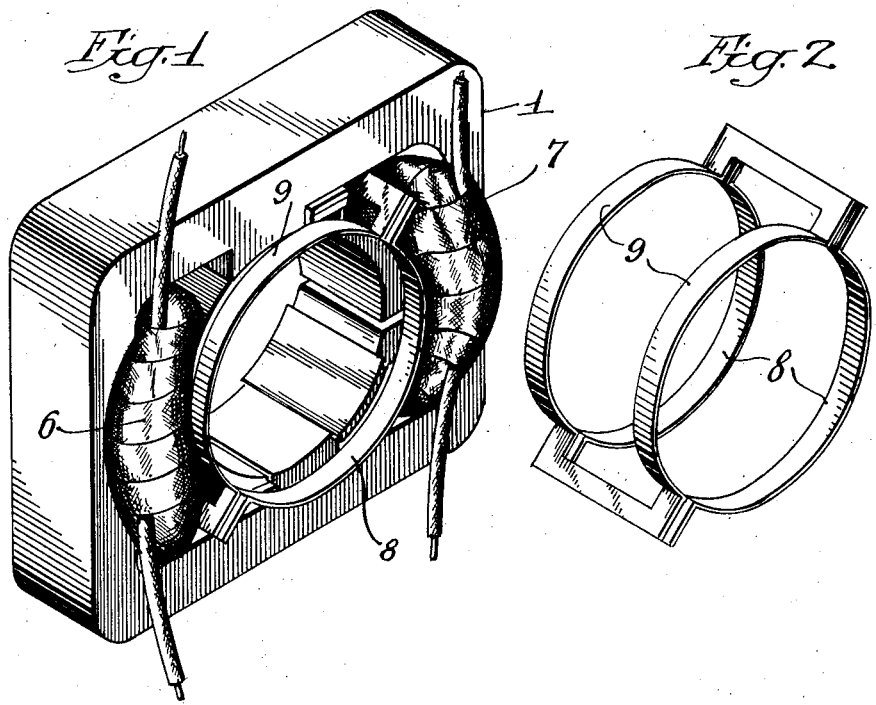
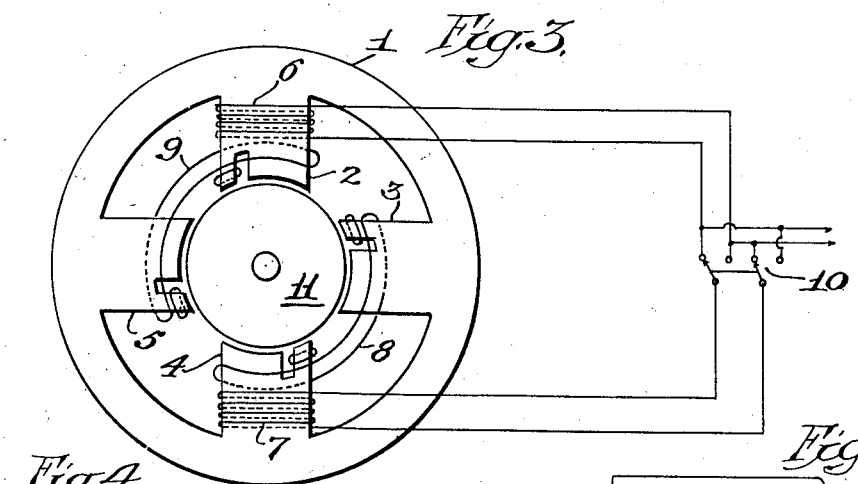
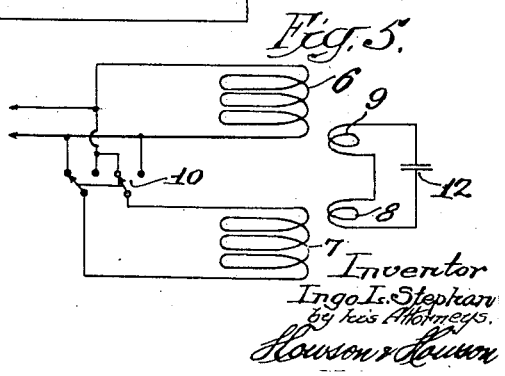
Inventor
Ingo L. Stephan
by his Attorneys
Howson & Howson Patented Feb. 8, 1944

2,341,482

UNITED STATES PATENT OFFICE 2,341,482

MULTISPEED MOTOR

Ingo L. Stephan, Delanco, N. J., assignor to Philco Radio and Television Corporation, Philadelphia, Pa., a corporation of Delaware Application February 9, 1942, Serial No. 430,121

5 Claims. (Cl. 172—278)

This invention relates to multi-speed motors and more particularly to a multi-speed, self-starting, induction motor adaptable for selective operation at any of its principal speeds.

For many applications it is highly desirable to have a multi-speed induction motor as a source of power. For example, such a motor would be useful in the phonograph art to drive the phonograph turntable. But such use has not been commercially acceptable because of the prohibitive cost of satisfactory multi-speed motors heretofore available.

Accordingly it is an object of the present invention to provide a fully self-starting multi-speed induction motor.

Another object of the invention is to provide a self-starting multi-speed induction motor which may be readily operated at any of its principal speeds.

A still further object of the invention is to provide a two-speed, self-starting, induction motor which may be selectively operated at either of its speeds by manipulation of a simple electrical switch.

Another object of this invention is to provide a multi-speed induction motor with simple means for starting the motor at any of its principal speeds.

In the drawing:

Fig. 1 is a perspective view of a motor stator having windings arranged in accordance with this invention;

Fig. 2 is a perspective view of the auxiliary windings shown in Fig. 1; and

Figs. 3, 4, and 5 are electrical circuit diagrams illustrating the electrical connections of the windings of the motor of Fig. 1.

Referring to the drawing and particularly Figs. 1 to 3 thereof, there is shown a stator which is preferably made from thin laminations of suitable steel stamped to form a continuous rectangular yoke portion 1 having four pole pieces integral with the sides of the yoke. The pole pieces are shown more clearly in Fig. 3 where they are numbered 2 to 5. Each of the pole pieces is notched so as to provide the conventional shaded pole commonly provided on induction motors of this type, there being a short-circuited loop of heavy copper surrounding the smaller portion of the pole which is thus provided, as indicated more clearly in Fig. 3. A pair of windings 6 and 7 are provided on two opposite poles 2 and 4. A conventional squirrel cage rotor 11 (shown in Fig. 3) may be employed. It will be recognized that the motor thus far described is a conventional four-pole squirrel cage induction motor in which the windings 6 and 7 may be so connected that the poles 2 and 4 are north poles and the poles 3 and 5 are south poles.

In accordance with the present invention, there is provided in addition to the above described structure one or more short-circuited link windings. In Figs. 1 and 3 two such windings 8 and 9 are provided. Each such winding encircles two adjacent poles on the stator 1, the winding 8 encircling poles 3 and 4 and the winding 9 encircling poles 2 and 5. These windings may be formed from several turns of small diameter wire or, preferably, they may be made from a single loop of copper of large cross section. In Figs. 1 and 2, these windings are formed of flat copper stock and they are shaped in complementary fashion, as illustrated, to fit within the stator of Fig. 1.

The electrical circuit of the above-described motor is shown in Figs. 3, 4, and 5. In Fig. 3 the main windings 6 and 7 are shown connected in parallel by means of a double-throw double-pole switch 10 which in its other position is adapted to reverse the polarity of one of said windings, so that by the manipulation of the switch 10, the motor may be connected for either two-pole or four-pole operation. With the motor connected for four-pole operation the poles 2 and 4 may be north poles, while the poles 3 and 5 may be south poles. With this connection the motor will start as a standard shaded pole motor, and the link windings 8 and 9 will have no effect on the operation of the motor, since there will be no current flowing therein because the flux from one main pole linking each link winding will be balanced by equal opposing flux from the other main pole.

With the motor connected for operation as a two-pole motor, the poles 2 and 4 will become north and south poles respectively, while the poles 3 and 5 may be termed neutral poles as they do not have windings and because the magnetic circuit for the flux resulting from the main windings does not include these poles. With the motor connected for two-pole operation, the link windings 8 and 9 will have current induced therein from the main windings and will produce flux in the poles 3 and 5. By causing the link windings to have relatively high resistance compared to their inductive reactance at the operating frequency, e. g. 60 cycles, as distinguished from the main windings which have relatively high inductive reactance and low resistance, the current in the link windings is caused to be substantially out of phase with the current in the main windings 6 and 7. Hence, the flux in poles 3 and 5 is substantially out of phase with that in the main poles. The link windings, therefore, convert the neutral poles 3 and 5 into auxiliary starting poles which serve to start the rotation of the rotor 11 when the motor is connected for two-pole operation. During two-pole operation the speed of the motor will be twice its normal speed during four-pole operation, as will be well understood.

Fig. 4 is the electric circuit diagram for the apparatus of Fig. 1 when the link windings comprise single turn circuits such as are illustrated in Fig. 2. As noted above, however, the link windings may comprise several turns of small diameter wire and when this is done it may be advantageous to connect the link windings in series and to insert a suitable condenser 12 as shown in Fig. 5. The condenser 12 will serve to increase the phase difference between the flux in the main and auxiliary poles to insure a high starting torque for the motor.

While it is not preferred, where economy is the primary consideration it has been found possible to use only one link winding to insure starting of the motor for two-pole operation even under full starting load.

One satisfactory embodiment of the present invention included a rectangular stator measuring ¾ by 1 inch in cross-section and made of thirty-one laminations of .025 inch steel. The main windings had an inductance of 1 henry and a resistance of 48 ohms, and the link windings were of the general shape shown in Fig. 2 with a cross-section measuring ¼ by $\frac{1}{16}$ inch. The starting torque of the motor was found to be about equal on both two-pole and four-pole operation.

It will be understood, of course, that the invention is not limited to the specific disclosure but is capable of various modifications.

I claim:

1. In a multi-speed induction motor, a stator comprising at least one pair of main poles and auxiliary poles intermediate said main poles and similar thereto, energizing windings on said main poles only, means for energizing said windings, means for selectively causing said main poles to assume the same polarity, whereby the motor operates as one having a number of poles equal to the sum of said main and auxiliary poles, for causing said main poles to assume opposite polarities, thereby effectively reducing the number of poles to that of said main poles, and electrical links each encircling collectively a main pole and an adjacent auxiliary pole only, whereby during the first-mentioned operation no current flows in the electrical links due to the counteraction of the flux in the interlinked poles, but during the last-mentioned operation the electrical links induce flux in the auxiliary poles which is out of phase with that in the main poles.

2. A multi-speed induction motor as claimed in claim 1, wherein said electrical links comprise flat conductors each forming a single loop and each having spaced arcuate portions and end portions connecting the arcuate portions.

3. A four-pole induction motor capable of operating at either of two predetermined speeds related substantially in the ratio of 2 to 1, comprising a rotor, a stator having a first pair of opposed poles and a second pair of opposed poles, shading windings on all four of said poles, primary windings on said first pair of poles only, switch means for selectively connecting said primary windings to a source of alternating current so as to cause said first pair of poles to have either like or opposite magnetic polarity, said second pair of opposed poles functioning as consequent poles when said first pair of opposed poles have like magnetic polarity, and a link winding encircling collectively one pole of said first pair of poles and that pole only of said second pair of poles which lies to the shading-winding-side of said one pole.

4. A four-pole induction motor as claimed in claim 3, wherein a second link winding encircles collectively the other two poles only.

5. A four-pole induction motor as claimed in claim 3, wherein said link winding consists of a single loop of conductor of large cross section.

INGO L. STEPHAN.